United States Patent [19]

Ziegler

[11] Patent Number: 4,762,244
[45] Date of Patent: Aug. 9, 1988

[54] RADIATOR OVERFLOW CONTAINER

[75] Inventor: David B. Ziegler, Eden Prairie, Minn.

[73] Assignee: Thermo King Corporation, Minneapolis, Minn.

[21] Appl. No.: 100,380

[22] Filed: Sep. 23, 1987

[51] Int. Cl.⁴ .............................................. B65D 51/16
[52] U.S. Cl. .................................. 220/203; 220/85 F; 220/86 R; 220/DIG. 32; 220/293
[58] Field of Search ........... 220/DIG. 32, 85 F, 86 R, 220/288, 293, 203

[56] References Cited

U.S. PATENT DOCUMENTS 3,772,760 11/1973 Zlotek ........................... 220/86 R X
4,342,799 8/1982 Schwochert ..................... 220/293 X

FOREIGN PATENT DOCUMENTS 2506265 11/1982 France ................................ 220/319

*Primary Examiner*—Stephen Marcus
*Assistant Examiner*—Nova Stucker
*Attorney, Agent, or Firm*—D. R. Lackey

[57] ABSTRACT

A radiator overflow container for receiving liquid at pressures above atmospheric, including a plastic body portion and a cylindrical or tubular metallic orifice. The metallic orifice has first and second axial ends, and inner and outer surfaces which define an opening which extends between the first and second axial ends. The metallic orifice has the first axial end embedded in the plastic body portion with a plastic-to-metal interface which includes an annular plastic portion which extends into the opening to define an annular, plastic sealing surface. A radiator cap, engageable with the second axial end of the metallic orifice, includes a depending portion which extends into sealing engagement with the annular, plastic sealing surface, to place the plastic-to-metal interface outside the higher-than-atmospheric pressure operating enviroment of the radiator overflow container.

4 Claims, 1 Drawing Sheet

RADIATOR OVERFLOW CONTAINER

BACKGROUND OF THE INVENTION

1. Field of the Invention

The invention relates to overflow containers for accommodating overflow of radiators used with liquid cooled internal combustion engines, such as gasoline and Diesel engines.

2. Description of the Prior Art

Radiator overflow containers or tanks for some liquid cooled internal combustion engines operate at higher than atmospheric pressure. Such radiator overflow tanks are made of metal, with a radiator cap forming a gasketed metal-to-metal seal between a metal disk of the cap and a metallic portion of the overflow container. For economic reasons it would be desirable to be able to construct the body portion of a radiator overflow container or tank of plastic, with a metallic mouth or orifice for receiving a radiator cap embedded in a plastic wall of the tank. The differences in coefficients of thermal expansion between plastic and metal embedments therein, however, create a plastic-to-metal interface which is not liquid tight, especially when subjected to pressures above atmospheric pressure, over the normal operating temperature range of radiator overflow containers, the upper end of which may be as high as 240 degrees F.

It is the object of the present invention to provide a radiator overflow container suitable for use at higher than atmospheric pressure which has a plastic body portion and a metallic orifice for releasable engagement with a radiator cap, which will not leak at the plastic-to-metal interface between the plastic body portion and metallic ofifice over the normal operating temperature range of the liquid radiator coolant.

SUMMARY OF THE INVENTION

Briefly, the present invention is a new radiator overflow container which has a plastic body and an embedded metallic ofifice for receiving a radiator cap, which container may be used at higher than atmospheric pressure without liquid leakage through the plastic-to-metal interface of the embedment. The metallic orifice is generally cylindrical or tubular, having first and second axial ends, and inner and outer surfaces which define an opening which extends between the axial ends. The first axial end is embedded in a plastic wall of the plastic body such that plastic extends along both the inner and outer surfaces. The plastic which extends along the inner surface defines a plastic annular sealing surface. The radiator cap, when engaged with the second axial end of the orifice, includes a depending portion which extends into the opening of the orifice to force a resilient gasket member into sealing engagement with the plastic annular sealing surface. This arrangement places the plastic-to-metal interface outside the portion of the container which operates above atmospheric pressure, preventing liquid leakage at the interface.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF THE PREFERRED EMBODIMENTS

Figure 1:
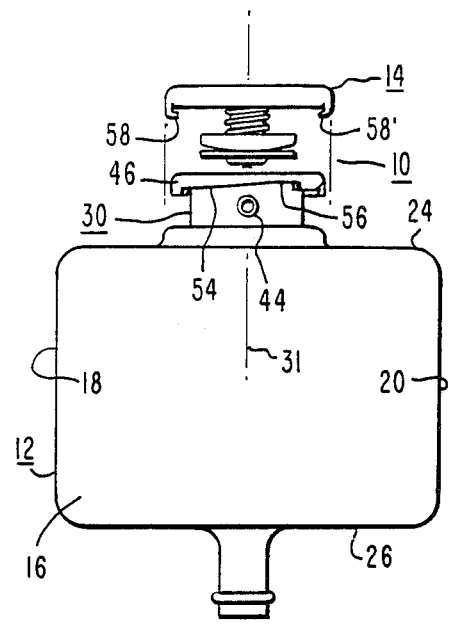
FIG. 1 is an exploded elevational view of a radiator overflow container and radiator cap assembly, which may be constructed according to the teachings of the invention.
Figure 2:
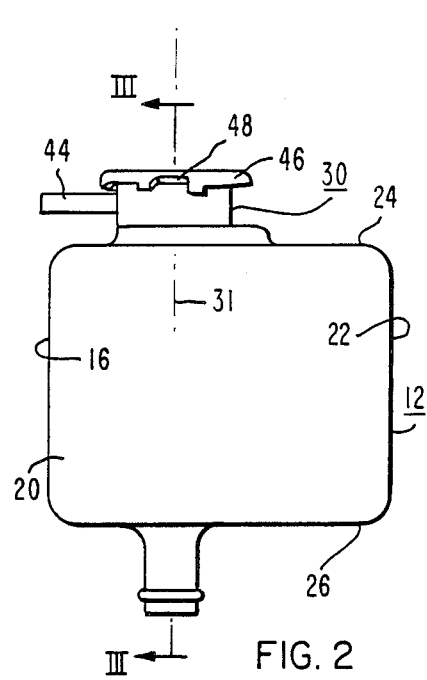
FIG. 2 is a side elevational view of the radiator overflow container shown in FIG. 1.
Figure 3:
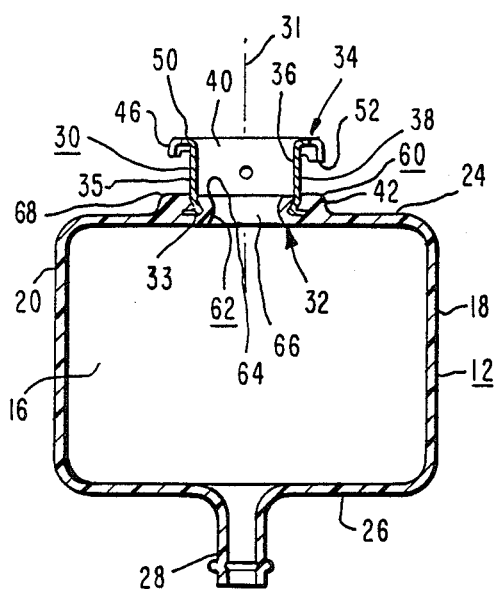
FIG. 3 is a cross sectional view of the radiator overflow container shown in FIG. 2, taken between and in the direction of arrows III—III.

Referring now to the drawings, and to FIG. 1 in particular, there is shown an exploded elevational view of a radiator overflow container and radiator cap assembly 10 which may be constructed according to the teachings of the invention. Assembly 10 includes a radiator overflow container or tank 12 and a radiator cap 14. FIGS. 2 and 3 will also be referred to when describing container 12, with FIG. 2 being a side elevational veiw of container 12, and FIG. 3 being a cross sectional view of tank 12 taken between and in the direction of arrows III—III in FIG. 2.

More specifically, container 12 is formed or molded of a non-metallic plastic material which will withstand the operating environment of a radiator overflow container. For example, it must withstand ambient temperatures in an engine compartment which may be as low as −20 degrees F. when an associated internal combustion engine is not operating, and as high as +240 degrees F. when the engine is operating and hot radiator coolant, such as ethylene glycol, is exchanged between an engine radiator and the radiator overflow container 12. Allied Plastic's 8280 HS Nylon has been found to be suitable, but other plastic materials which will withstand the chemical environment at the operating temperatures and pressures of an engine radiator may be used.

Container 12 includes side walls 16, 18, 20 and 22, a top 24, and a bottom 26. Bottom 26 has an outwardly extending tubular member 28 formed integrally therewith for receiving one end of a hose (not shown) through which liquid radiator coolant is exchanged between an engine radiator and container 12. Top 24 includes a metallic mount or orifice 30 for cooperatively receiving radiator cap 14, with orifice 30 being embedded in top 24 at the time container 12 is molded from a plastic material, to form a plastic-to-metal interface 33, best shown in FIG. 3.

More specifically, orifice 30, which may be formed of a suitable metallic material, such as brass, has a generally cylindrical or tubular configuration having a longitudinal axis 31, including first and second axial ends 32 and 34, respectively, a wall portion 35 having inner and outer surfaces 36 and 38, respectively, and an opening 40 which extends between the axial ends. The first axial end 32 is flared or flanged, preferably in an outward direction. For example, the first axial end may first be scalloped to create a plurality of tabs which are subsequently bent outwardly to form a plurality of perimetrical flanges 42.

Wall 35 may have an opening therein in which a tubular member 44 is fixed, such as by brazing. Tubular member 44 provides means for attaching a hose to orifice 30 for venting container 12 when the pressure in the container 12 exceeds a predetermined relief pressure rating determined by the particular radiator cap 14 which is selected, which in turn depends upon the characteristics of the cooling system of the associated internal combustion engine.

The second axial end 34 of metallic orifice 30 includes a perimetrical flange 46 which is notched on opposite sides of flange 46, such as indicated at 48, to receive radiator cap 14. Perimetrical flange 46 has both outwardly extending and depending portions, 50 and 52, respectively, with the depending portion 52 defining a pair of oppositely disposed camming surfaces, such as indicated at 54 in FIG. 1, with camming surfaces 54 "camming" radiator cap 14 axially inward as it is turned clockwise. The depending portion 52 includes a pair of notches, such as indicated at 56, to provide a pressure relief position while cap 14 is still engaged with orifice 30, and the outwardly extending portion 50 is notched to define the hereinbefore mentioned notches 48 for receiving complementary "hooks" 58 and 58' on the radiator cap 14.

As best shown in the cross sectional view of container 12 in FIG. 3, top 24 of container 12 has a thickened portion 60 at the point where the first axial end 32 of orifice 30 is embedded, with the thickened portion 60 providing several functions. For example, thickened portion 60 increases the mechanical strength of the metallic embedment or orifice 30, as it provides more plastic around the perimetrical flanges 42. The thickened portion 60 includes a portion 62 which extends into opening 40 of metallic orifice 30 to define a substantially flat annular sealing surface 64, as well as to define an opening 66 in registry with opening 40 defined by metallic orifice 30. Flat sealing surface 64 is parallel with an imaginary plane disposed across the second axial end of orifice 30 transverse to longitudinal axis 31, and it is disposed a predetermined dimension from this imaginary plane which is selected to cause radiator cap 14 to provide a liquid tight seal at annular sealing surface 64 when radiator cap 14 is advanced to its fully engaged position with orifice 30. Thickened portion 60 also includes a portion 68 which extends along the outer surface 38 of orifice 30 for a predetermined dimension.

Radiator cap 14, which may be of conventional construction, includes a cover portion 70, a depending post 72 fixed to the inside of the cover portion 70, a spring 74 disposed about post 72, a rotatable metallic pressure member 76 which is axially slidable on post 72 between first and second stops, with said spring 74 resiliently urging metallic pressure member 76 to its first stop when cap 14 is disengaged from container 12, and a resilient gasket member 78.

Figure 4:
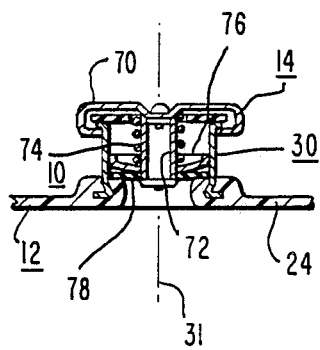
FIG. 4 is a fragmentary cross sectional view of a radiator overflow container which is similar to that of FIG. 3, except further illustrating a cross sectional view of the radiator cap of FIG. 1 engaged with the mouth or orifice of the container.

As shown in FIG. 4, when radiator cap 14 is engaged with orifice 30 and turned clockwise, metallic member 76 forces gasket member 78 against annular sealing surface 64, with continued clockwise turning of cap 14 pulling cover 70 closer to the second axial end 34 of orifice 30 via camming surfaces 54, compressing spring 74 and increasing the pressure of metallic member 76 against gasket member 78 and annular sealing surface 64. Thus, a liquid-tight seal is established at sealing surface 64, before the plastic-to-metal interface 33 between the plastic of container 12 and the metal of orifice 30 is encountered, placing interface 33 outside the high pressure portion of container 12 and precluding liquid leaks about the interface. Should the internal pressure of container 12 exceed the predetermined pressure relief rating of cap 14, the spring pressure will be overcome, allowing excess pressure to be relieved by venting gasses and/or liquid coolant out tubular member 44, instead of building up pressure on the relief side of metallic pressure member 76 which would attempt to force fluids through interface 33.

I claim as my invention:

1. A radiator overflow container, comprising:
a plastic container having a metallic orifice,
said plastic container having wall portions which define an enclosure for a liquid which may have above-ambient and above-atmospheric operating temperatures and pressures, respectively,
said metallic orifice having a substantially cylindrical configuration, including first and second axial ends, an opening which extends between the first and second ends, and inner and outer surfaces,
said first end of the metallic orifice being embedded in a wall portion of said plastic container via a plastic-to-metal interface sufficient to mechanically hold the metallic orifice in the assembled position at the operating temperatures and pressures of the associated liquid, but which may not be liquid tight, and wherein the plastic of said wall portion extends into the opening of said metallic orifice to define a plastic annular sealing surface adjacednt to the inner surface of said metallic orifice,
and a cap releasably engageable with said metallic orifice,
said cap including a depending portion which extends into the opening of said metallic orifice and contacts said annular sealing surface when the cap is engaged with said metallic orifice, to seal the tank with a cap-to-container seal which places the plastic-to-metal interface outside the portion of the container which may operate above atmospheric pressure.

2. The container of claim 1 wherein the annular sealing surface is substantially flat and parallel with a plane disposed across the second end of the orifice.

3. The container of claim 1 wherein the embedded first end of the metallic orifice is outwardly flanged.

4. The container of claim 1 wherein the depending portion of the cap includes a captured metallic disc movable between predetermined limits and resilient gasket means, and the cap further includes spring means for urging the captured metallic disc towards one of its limits while concurrently forcing the resilient gasket means against the plastic annular sealing surface, when the cap is engaged with the metallic orifice.

* * * * *